United States Patent
Slesinski et al.

(10) Patent No.: US 7,158,241 B2
(45) Date of Patent: Jan. 2, 2007

(54) METHOD FOR CALIBRATION AND CERTIFYING LASER PROJECTION BEAM ACCURACY

(75) Inventors: Raymond J. Slesinski, Arnold, MO (US); Richard J. Steckel, Washington, MO (US); Curtis M. Ashford, St. Peters, MO (US); Jeffery J. Luner, Collinsville, IL (US)

(73) Assignee: The Boeing Company, Chicago, IL (US)

( * ) Notice: Subject to any disclaimer, the term of this patent is extended or adjusted under 35 U.S.C. 154(b) by 279 days.

(21) Appl. No.: 10/871,728

(22) Filed: Jun. 17, 2004

(65) Prior Publication Data

US 2005/0280803 A1 Dec. 22, 2005

(51) Int. Cl.
*G01B 11/14* (2006.01)

(52) U.S. Cl. .......................................... 356/620

(58) Field of Classification Search ................. 356/121, 356/614–615, 620, 613, 638–640, 622, 154
See application file for complete search history.

(56) References Cited

U.S. PATENT DOCUMENTS

| | | | | | |
|---|---|---|---|---|---|
| 3,599,336 | A | * | 8/1971 | Walsh | 33/286 |
| 3,742,581 | A | * | 7/1973 | Roodvoeis | 29/407.04 |
| 3,879,132 | A | * | 4/1975 | Myeress | 356/153 |
| 3,907,435 | A | * | 9/1975 | Roodvoets | 356/153 |
| 4,681,439 | A | * | 7/1987 | Shoemaker | 356/154 |
| 4,825,258 | A | * | 4/1989 | Whitson | 356/153 |

FOREIGN PATENT DOCUMENTS

WO    WO 96/35922    11/1996

OTHER PUBLICATIONS

International Search Report mailed Dec. 16, 2005.

* cited by examiner

*Primary Examiner*—Gregory J. Toatley, Jr.
*Assistant Examiner*—Isiaka O. Akanbi
(74) *Attorney, Agent, or Firm*—Ingrassia Fisher & Lorenz, P.C.

(57) ABSTRACT

A system for certifying laser projection beam accuracy includes a certification fixture having a test pattern and a color background. The certification fixture is configured so that any portion of the laser projection beam reflected from the color background is reflected with a color contrasting to that of the laser beam or of the test pattern. Contrast can be further enhanced by making the pattern of a material that absorbs the laser beam color. Failure of the test is indicated by the presence of any of the laser beam light reflecting from the background. Passage of the test is indicated by the laser beam striking only the test pattern. A functional test pattern tests for both laser beam width and positioning accuracy. A method is provided to use a calibration test pattern to test laser beam width and length projection accuracy independently of one another.

31 Claims, 4 Drawing Sheets

METHOD FOR CALIBRATION AND CERTIFYING LASER PROJECTION BEAM ACCURACY

BACKGROUND OF THE INVENTION

The present invention generally relates to laser projection technology and, more particularly, to calibration of laser projection systems that can project preprogrammed features at pre-defined locations and be used comparatively to verify the presence, absence or proper positioning of manufactured features, parts or subassemblies at these pre-defined locations.

Laser projection technology can provide a means to accurately project geometric patterns—such as squares, circles, crosses, and line segments—onto a surface, for example, that of a manufactured part. The technology can enable the precise location of a manufactured part relative to other manufactured parts, or some other convenient frame of reference, to be determined without using mechanical scales or other hard tooling.

The geometric patterns referred to above are typically projected onto a surface by "tracing" a laser beam, which when stationary may appear as a dot on the surface, over the surface quickly enough so that persistence of vision causes the laser beam dot on the surface to appear as a curve or line having a certain width or thickness, which generally is the diameter of the dot. The laser beam can be traced onto the surface using a pair of highly polished and flat mirrors that accurately rotate in a synchronic fashion to "bend" and direct the light beam. The mirrors can be computer controlled so that the patterns may be projected using CAD-generated data by tracing a laser beam onto the surface. For example, one laser projection system currently in use provides a beam with a nominal thickness or width of approximately 0.030 inches (in.) and a nominal positioning accuracy of ±0.015 in. at a nominal distance of 15 feet.

For general manufacturing use, and more specifically for practical use in the aircraft industry where the precision and accuracy of measurements need to be known, the nominal claims for beam width and positioning accuracy need to be verified. For example, a user may wish to verify the manufacturer's or vendor's claims to accuracy on first receiving a laser projection system. Of equal or greater importance is that the user may wish to check that various hazards and contingencies of the manufacturing environment have not contributed to a degradation of the accuracy of such a system, for example, by being bumped into or otherwise accidentally damaged. Routine quality control and maintenance checks may also be desired by the user of such a system. A question that arises is that since there are no physical attributes to the laser projection system except for the light that is perceived through the human eye, how can the user of the laser projection system be reasonably confident the beam is being projected accurately? In other words, can the "human factor" be taken out when verifying the beam accuracy? And consequently, is there a fixture that can be used to check the beam accuracy?

Previous methods for verifying beam accuracy have included using an artifact—such as an aluminum block—painted black with engraved shapes—such as lines, circles, and squares—having curved or linear elements that are the same nominal width as the laser beam located on the surface. The laser projection system is typically used to project the same shapes back onto the artifact to see if the laser beam-projected shapes align with the engraved shapes. The outcome of such a test then relies on a visual determination as to whether or not the laser beam "bleeds" over the engraved shapes, where, and to what extent. Therefore, a verification method has been sought that can place a lesser degree of reliance on visual acuity of the person performing the test and that can avoid the need for judgment and subjectivity on the part of the person performing the test.

As can be seen, there is a need for verification of laser beam width and positioning accuracy for laser beam projection systems. There is also a need for objective laser beam projection system accuracy verification—such as verification of laser beam width and positioning accuracy for laser beam projection systems—that avoids dependence on visual acuity and the need for judgment and subjectivity on the part of the person performing the test. There is also a need for a means for laser beam projection system testing that is portable and easily performed in a manufacturing environment.

SUMMARY OF THE INVENTION

In one aspect of the present invention, a system for certifying laser beam projection accuracy includes a certification fixture having a pattern and a color background; and a projection apparatus configured to project a laser beam of a first color on the pattern with an accuracy to be determined. Any portion of the laser beam projected onto the fixture but not on the pattern is reflected from the color background and is reflected with a second color different from the first color.

In another aspect of the present invention, a system for certifying laser beam projection accuracy includes a certification fixture having a pattern and a color background; and a laser projection system that projects a laser beam having a nominal width and a first color. The laser projection system projects the laser beam onto the pattern. When the laser beam does not conform to the pattern, a portion of the laser beam is reflected from the color background and is reflected with a second color different from the first color.

In still another aspect of the present invention, a fixture for certifying laser beam projection accuracy includes: a transparent body; an opaque pattern applied to the transparent body; and a reflective background. When a laser beam having a first color is projected onto the pattern but does not conform to the pattern, a portion of the laser beam is reflected from the background and is reflected with a second color different from the first color.

In yet another aspect of the present invention, a laser measurement system includes: a laser projection system that projects a laser beam having a first color, a nominal beam width, and a nominal positioning accuracy; and a certification fixture having a substantially transparent body, a pattern formed on a front surface of the body, and a color background on a rear surface of the body. Illumination of the pattern and the background through the body by the laser beam provides radiation reflected from a portion of the background but not from the pattern that contrasts in color to radiation reflected from the pattern but not from the background.

In a further aspect of the present invention, a system for certifying laser beam projection accuracy includes: a laser projection system that projects a laser beam having a first color, a nominal beam width, and a nominal positioning accuracy; a certification fixture having a body; a pattern formed on a front surface of the body; and a color background on a rear surface of the body. Projection of the laser beam on the pattern and the background through the body provides radiation reflected from a portion of the background but not from the pattern that contrasts in color to radiation reflected from the pattern but not from the background. The laser projection system projects the laser beam using data measured from the pattern to trace the laser beam on the pattern. The pattern includes a functional test pattern for a functional test of beam width combined with positioning accuracy. The functional test pattern includes a curvilinear functional test element having a width equal, within a specified tolerance, to the nominal beam width of the laser beam plus twice the nominal positioning accuracy of the laser beam so that the laser projection system passes the functional test when the laser projection system projects the laser beam within the pattern and the laser projection system fails the functional test when the laser projection system projects at least a portion of the laser beam outside the pattern and onto the color background. The pattern also includes a calibration test pattern for a calibration test of beam width. The calibration test pattern includes a curvilinear calibration test element having a width equal, within a specified tolerance, to the nominal width of the laser beam so that the laser projection system passes the calibration test when the laser projection system projects the laser beam within the pattern; and the laser projection system does not pass the calibration test when the laser projection system projects at least a portion of the laser beam outside the pattern and onto the color background.

In a still further aspect of the present invention, a method for certifying laser beam projection accuracy includes: projecting a laser beam onto a certification fixture having a pattern and a background in which the laser beam conforms to the pattern when the laser beam projects only onto the pattern and the laser beam does not conform to the pattern if at least a portion of the laser beam projects off of the pattern and onto the background. The method also includes reflecting a portion of the laser beam from the background of the certification fixture in which the portion has a first color that contrasts with a second color of the background of the certification fixture, when the laser beam does not conform to the pattern; but not reflecting radiation of the first color contrasting to the second color of the background when the laser beam does conform to the pattern.

In a yet further aspect of the present invention, a method for performing a calibration test includes: projecting a laser beam onto a certification fixture, having a calibration test pattern and a background. The laser beam conforms to the calibration test pattern when the laser beam projects only onto the calibration test pattern and the laser beam does not conform to the calibration test pattern if at least a portion of the laser beam bleeds over the calibration test pattern and onto the background. The method further includes reflecting, when the laser beam does not conform to the calibration test pattern, at least a portion of the laser beam from the background of the certification fixture in which the reflected portion has a first color that contrasts with a second color of the background of the certification fixture; but not reflecting radiation of the first color contrasting to the second color of the background when the laser beam does not bleed over the calibration test pattern. The method also includes: repositioning the laser beam when a first edge of the laser beam bleeds over the calibration test pattern; failing the calibration test when two edges of the laser beam simultaneously bleed over the calibration test pattern; and passing the calibration test when the laser beam fits within the calibration test pattern.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended, claims.

Broadly, the present invention provides verification of nominal laser beam width and positioning accuracy for laser beam projection systems. Such systems have wide applicability for many types of manufacturing wherever accurate spatial (as opposed to temporal) measurement is needed. For example, such systems can be used in the aircraft manufacturing industry to precisely locate and position subassemblies within structures assembled from a number of parts.

In one embodiment, testing of laser beam projection system accuracy exploits the use of contrasting color reflection of different portions of the same laser beam, and the easily determined presence or absence of contrasting colors to provide laser projection system verification that avoids dependence on visual acuity and subjective judgment of test personnel. Prior art testing that relies on engraved shapes in a test fixture has not exploited the human visual ability to easily distinguish contrasting colors nor the ability to easily determine whether contrasting colors or only one color is present. In one embodiment, the present invention provides a portable fixture that can be easily set up and used within the manufacturing environment, avoiding the need for removal to a lab or test facility of equipment that is already in use. Thus, routine quality control checks and maintenance of systems can be more easily performed than with complicated or delicate lab equipment requiring a specialized environment.

A further novelty of one embodiment of the present invention is a portable test fixture that provides for a calibration test that can isolate testing of beam width from testing of beam positioning accuracy.

Figure 1:
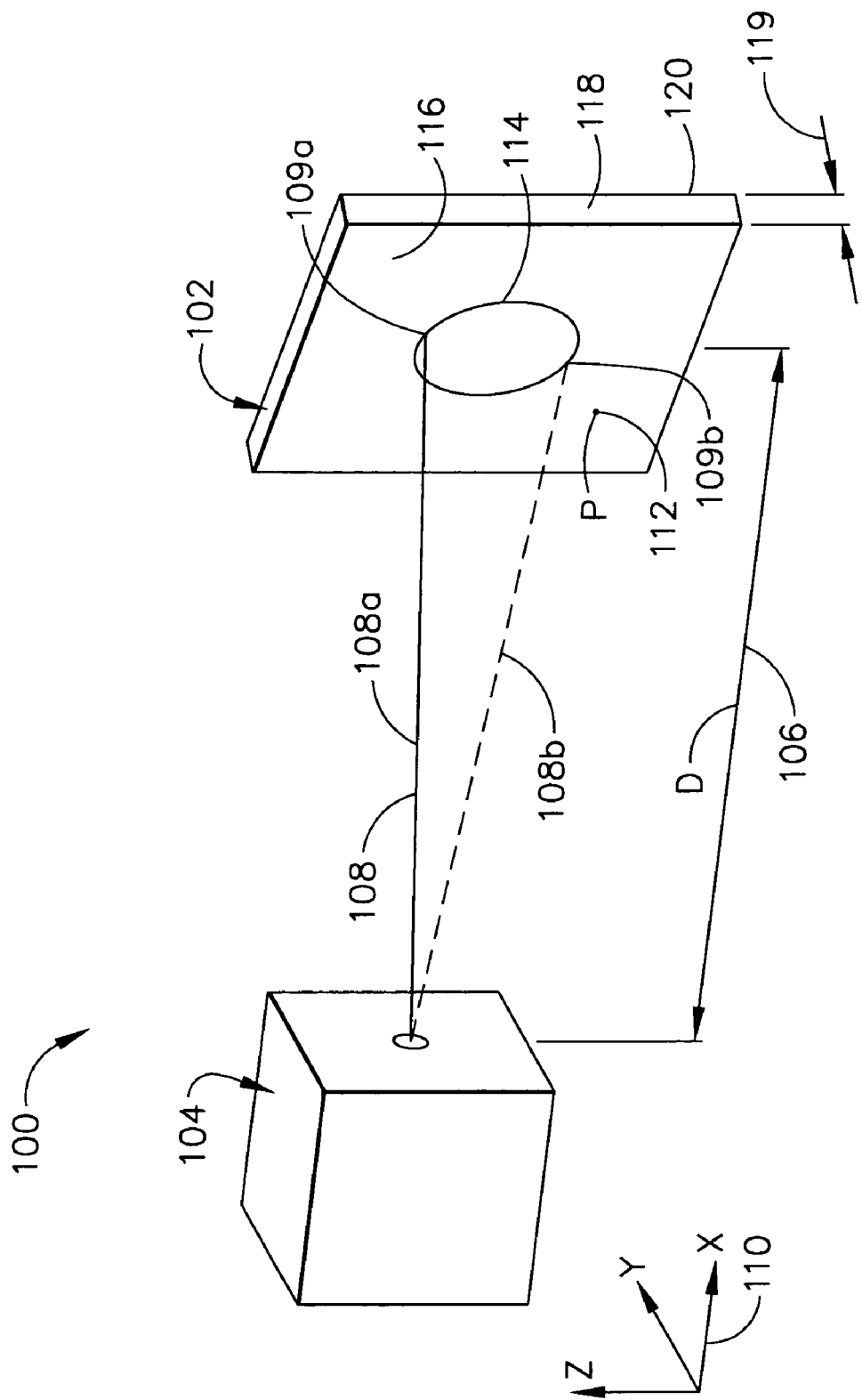
FIG. 1 is a perspective view of a system for calibrating and certifying laser projection beam accuracy in accordance with one embodiment of the present invention.

Referring now to FIG. 1, a system 100 for calibrating and certifying laser beam projection accuracy, e.g., the accuracy of a laser beam projection system, is illustrated in accordance with one embodiment of the present invention. A laser beam projection system may be considered to be accurate, or to provide a required degree of laser beam projection accuracy, if it can project a dot of light onto a surface at some nominal projection distance from the surface so that the diameter of the dot on the surface is less than a specified diameter—referred to as the nominal beam width, and the position of the dot on the surface is within some specified tolerance of an ideal position on the surface—the specified tolerance being referred to as the positioning accuracy. System 100 may include a calibration/certification test fixture 102, which is referred to more briefly as "test fixture" or certification fixture 102. System 100 may also include a laser beam projection system 104, or projection apparatus, having a nominal beam width and a nominal beam positioning accuracy. Such systems are commercially available and claim various nominal beam widths and beam positioning accuracies. For purposes of illustrating one exemplary embodiment, laser projection system 104 can be a system with a specified nominal beam width of 0.030 in. (typically given as a "not to exceed" specification) and a nominal positioning accuracy of ±0.015 in. at a nominal projection distance 106 (labeled D in FIG. 1) of 15 feet. Thus, the exemplary laser projection system 104 should be capable of projecting on fixture 102 a laser beam with the nominal beam width and positioned within a tolerance not exceeding the nominal positioning accuracy. In addition, the same laser projection system 104 may have a specified nominal beam width of 0.012 in. and a nominal positioning accuracy of ±0.006 in. at a nominal projection distance 106 of 6 feet, and a specified nominal beam width of 0.080 in. and a nominal positioning accuracy of ±0.040 in. at a nominal projection distance 106 of 40 feet. The exemplary description given below may be modified to accommodate other projection systems that may provide different specifications.

Laser beam projection system 104 may project a laser beam 108 at its nominal beam width and positioning accuracy onto a target. In the example shown in FIG. 1, the target may be certification fixture 102 when laser projection system 104 is being certified or tested, but the target could also be a manufactured part, as described above, or other item needed to be measured or used for determining a measurement when laser beam projection system 104 when, for example, laser projection system 104 is being used for manufacturing purposes. A laser beam projection system—such as laser beam projection system 104—typically includes a computer or some form of processor (not shown) that allows it to determine its spatial position relative, for example, to some 3-dimensional frame of reference such as x-y-z coordinate system 110. The position of certification fixture 102 relative to x-y-z coordinate system 110 may be established for use by the processor of laser projection system 104 using one or more origin points P—such as point 112 shown in FIG. 1. Establishment of position and orientation, relative to a reference frame, of a target—such as certification fixture 102—for a laser projection system—such as projection system 104—can be accomplished, for example, by following the manufacturer's instructions for the laser projection system at hand, and is generally well understood in the art.

Certification fixture 102 may include a geometrical pattern 114 disposed at a front surface 116 of certification fixture 102. FIG. 1 shows pattern 114 in the form of a circle, for example, although many different geometrical shapes—such as squares, diamonds, rectangles, line segments, circles, ellipses, and parabolas—can be used, which may in general include straight lines and curves having a certain prescribed width (or "line thickness") and referred to as "curvilinear elements". So for example, the circular curve forming the circle of pattern 114 may be referred to as a curvilinear element. Thus, the sides of a square, an isolated line segment, or a curve forming a parabola may all be referred to as curvilinear elements of a pattern such as pattern 114.

Pattern 114 may be applied to front surface 116 in any number of different ways. Pattern 114 may be substantially opaque to the color of light projected by laser projection system 104 in laser beam 108. For example, pattern 114 may be etched, printed, or silk-screened on surface 116, and lithographic or other processes exploiting computer equipment and CAD technology may be used, as apparent to one of ordinary skill in the art. For example, a prototype pattern 114 may be formed by using a computer plotter to print pattern 114 on a transparency and adhering the transparency to front surface 116 of certification fixture 102. A CAD model may be used, for example, to provide CAD model data for forming pattern 114 to within a desired degree of accuracy. For example, the width of curvilinear elements may be prescribed in terms of the nominal beam width and a tolerance. Some examples are given in relation to FIG. 4, described below.

The same CAD model data used to form a test pattern—such as pattern 114—may be provided to laser projection system 104 so that laser projection system 104 may be expected to control laser beam 108 to project onto and trace around pattern 114. For example, laser beam 108 at a first position 108a may project onto pattern 114 at position 109a and laser projection system 104 may control laser beam 108 to trace pattern 114 by moving laser beam 108 to any other position on pattern 114—such as position 109b where laser beam 108 has been moved to position 108b. As can be understood by one of ordinary skill in the art, CAD model data may need to be converted to a format acceptable to laser projection system 104, and the accuracy and precision of beam tracing may be increased by updating the CAD data from actual measurements of pattern 114, for example, by modifying the CAD model data to reflect any differences between the actual pattern 114 as measured and an ideal pattern 114 that would perfectly correspond to the CAD model data for pattern 114. Given precise pattern data -such as for pattern 114—and establishment of position and orientation of the pattern relative to a reference frame—such as x-y-z coordinate system 110—laser projection system 104 may be tested by attempting to trace laser beam 108 around pattern 114 and noting any discrepancies between the laser beam trace and the pattern. Depending on the pattern, different types of tests may be performed, as described below.

Certification fixture 102 may have a body 118 and a rear surface 120. Body 118 may be transparent and may be formed, for example, of a clear sheet or plate of polycarbonate or glass, so that front surface 116 and rear surface 120 are illuminable from the same direction. Any practical thickness 119 may be used that may provide adequate self-support of body 118 and may provide for a visible reflection of laser beam 108 from rear surface 120. For example, the thickness 119 of body 118 may be approximately 0.25 in. Rear surface 120 may be provided with a reflecting color background 122 (shown in FIG. 2), which may be substantially reflective to the color of light projected by laser projection system 104 in laser beam 108. Thus, when illuminated from the direction of front surface 116, for example, by laser beam 108, light may be substantially blocked by opaque pattern 114, substantially transmitted by transparent body 118, or substantially reflected by reflecting background 122 and retransmitted by transparent body 118, or any combination of the preceding. Background 122 may be painted on rear surface 120 with, for example, fluorescent paint, to enhance the visibility of a reflection of laser beam 108 back through body 118 to the eye of an operator of system 100, and may in fact provide a reflection the color of which contrasts to that of laser beam 108, to that of pattern 114, to that of background 122 itself or any combination of the preceding. In the following, reference may be made to colors contrasting to each other—such as a first and second color. In one such instance, for example, the expression "first color" may denote a first wavelength range, and the expression "second color" may denote a second wavelength range that is included in the first wavelength range." Thus, for a laser beam of a "first color", a reflected portion of the beam, with a "second color", can have a different wavelength, i.e., the reflected radiation may have a frequency that is included in the frequency spectrum of the incident beam. In one embodiment, for example, a green laser beam reflecting off a fluorescent orange background has a yellow-orange color that contrasts both to the green color of the laser beam and the fluorescent orange color of the background.

Figure 2:
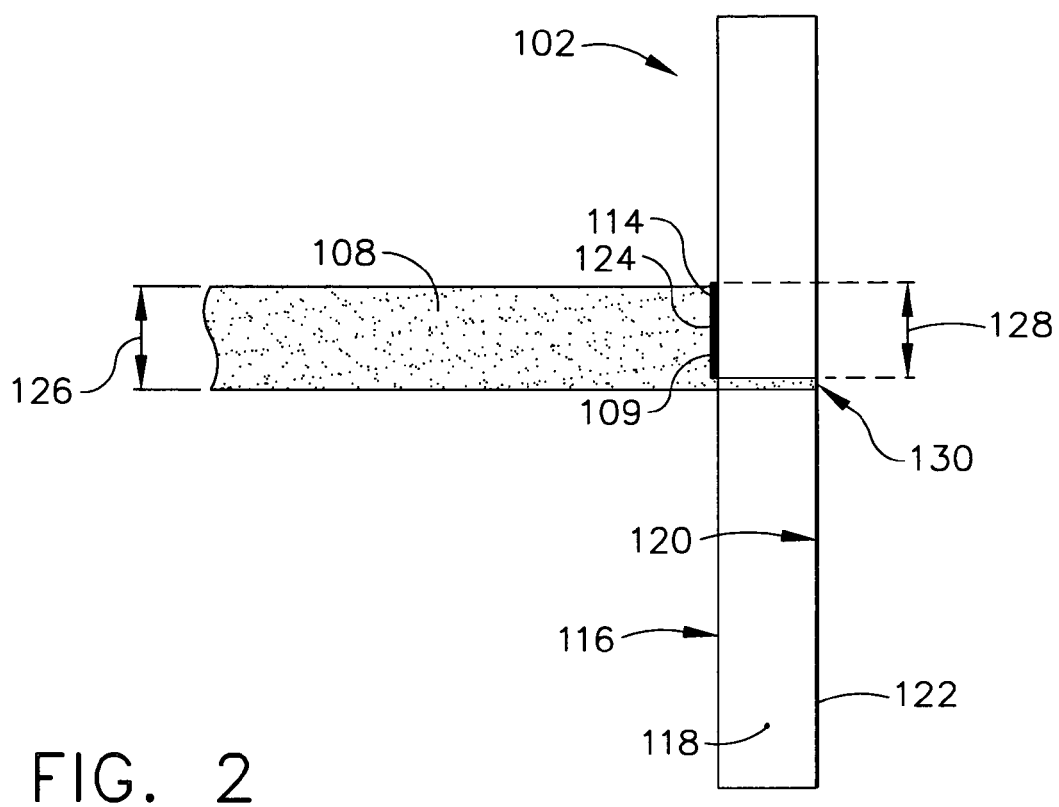
FIG. 2 is a cross sectional view of a calibration/certification fixture and an impinging laser beam in accordance with one embodiment of the present invention.

FIG. 2 shows a cross sectional view of certification fixture 102 with laser beam 108 projecting on curvilinear element 124 of pattern 114. Laser beam 108 has nominal width 126. Curvilinear element 124 of pattern 114 has width 128 at position 109 where curvilinear element 124 (and pattern 114) is shown in cross section. Pattern 114 may be black, for example, so that if the laser projection system 104 conforms at position 109, curvilinear element 124 may substantially block laser beam 108 from reaching rear surface 120 so that no reflection may be seen from rear surface 120 and only curvilinear element 124 may be illuminated by laser beam 108. For a green laser beam 108, for example, curvilinear element 124 of pattern 114 may reflect green light from the black surface of pattern 114 at position 109. Pattern 114 may also have a color that absorbs the specific wavelength of laser beam 108, e.g., green, so that no reflection or very little reflection is visible when laser projection system 104 conforms at position 109.

If laser projection system 104 does not conform at position 109 (as shown in FIG. 2) a portion 130 of laser beam 108 may spill over the edge of curvilinear element 124 so that curvilinear element 124 does not substantially block laser beam 108 from reaching rear surface 120 and a reflection of portion 130 of laser beam 108 may be seen from rear surface 120 as well as any illumination of curvilinear element 124 by laser beam 108 that may occur. In this regard a laser beam—such as laser beam 108—will be said to conform to a pattern—such as pattern 114—if the laser beam illuminates only the pattern without any illumination of the background by a portion—such as portion 130—that misses the pattern. In other words, a laser beam conforms to a pattern if the laser beam or the pattern traced out by the moving laser beam fits within the pattern without spilling or bleeding over off an edge of the pattern onto the background. An example of such a bleeding over of a nonconforming laser beam is depicted in FIG. 2.

An example of laser beam 108 not conforming to pattern 114 may be described as simultaneous illumination of pattern 114 and background 122 by laser beam 108 so that radiation reflected from the pattern 114 but not from the background 122 contrasts in color to radiation reflected from the background 122 but not from the pattern 114. In addition, radiation reflected by portion 130 may contrast in color to radiation reflected from the background 122 but not from portion 130. For a conforming laser beam 108, there may be substantially no laser beam 108 illumination of background 122, i.e., no portion 130 contrasting in color both to pattern 114 and background 122.

Color background 122 may reflect a color that enhances contrast of any reflection—such as portion 130—of laser beam 108. For a green laser beam 108, for example, fluorescent orange paint may be used to provide background 122 so that a contrasting yellow-orange reflection of portion 130 of green laser beam 108 may be provided when laser projection system 104 does not conform at position 109. Thus, for a nonconforming laser beam 108, portion 130 may provide reflection of a color contrasting to both the color of the pattern 114 (where illuminated by laser beam 108) and background 122 (where not illuminated by laser beam 108). If pattern 114 has a color that absorbs the specific wavelength of light emitted by the laser projection system 104, e.g., green, then the visibility and contrast of reflected portion 130 of green laser beam 108 may be further enhanced when laser projection system 104 does not conform at position 109. It should be apparent that, although a green laser, black or absorbent pattern, and fluorescent orange background colors illustrate one example, a red or other color of laser could be used and the pattern and background colors could be modified to achieve functionally equivalent visual effects of contrast. Thus, as shown by the example provided, whether pattern 114 substantially absorbs the color of radiation of laser beam 108, or reflects the color or some other color, a combination of colors or properties can be chosen for laser beam 108, pattern 114, and background 122 so that for a nonconforming laser beam 108, portion 130 may provide reflection of a color contrasting to both the color of the pattern 114 (where illuminated by laser beam 108) and background 122 (where not illuminated by laser beam 108).

Figure 3A:
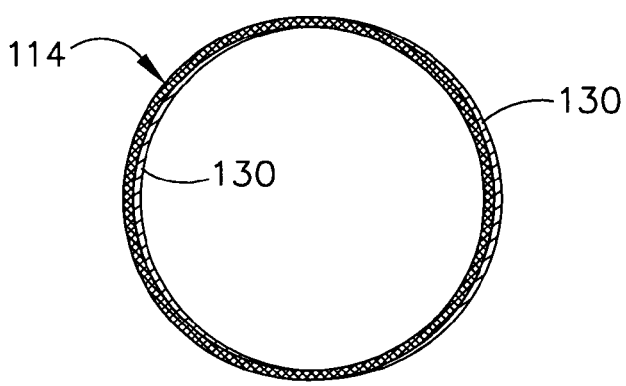
FIG. 3A is an elevational view of a pattern of a calibration/certification fixture when illuminated by a nonconforming laser beam illustrating an example of the sort of image that may be seen according to an embodiment of the present invention when a laser projection system does not conform to specifications.
Figure 3B:
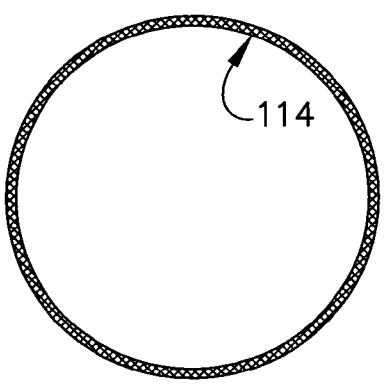
FIG. 3B is an elevational view of a pattern of a calibration/certification fixture when illuminated by a conforming laser beam illustrating an example of the sort of image that may be seen according to an embodiment of the present invention when a laser projection system does conform to specifications.

FIG. 3A shows an example illustration of the appearance of pattern 114 when illuminated by a non-conforming laser projection system 104. Pattern 114 is depicted as being perceivable by a first color, whether pattern 114 reflects illumination from laser beam 108 or substantially absorbs illumination from laser beam 108, and portions 130, which may indicate non-conformance of laser projection system 104, are depicted as being perceivable by a second contrasting color. FIG. 3B shows an example illustration of the appearance of pattern 114 when illuminated by a conforming laser projection system 104. Pattern 114 is depicted as being perceivable by a first color, whether pattern 114 reflects illumination from laser beam 108 or substantially absorbs illumination from laser beam 108, without contrasting color indications.

In summary, using a green laser beam 108 and fluorescent orange background color for rear surface 120 as illustrative example, if the laser projector of projection system 104 is projecting correctly, all of the projected beam 108 may fall within the edges of the geometric shapes or patterns 114 on the top surface 116 of fixture 102. For example, if the curvilinear elements 124 of pattern 114 are black, then the green laser light only will be reflected. If the curvilinear elements 124 of pattern 114 are made of a color that absorbs the wavelength of light emitted by the laser projector, then substantially no light may be reflected. If the projector is not projecting correctly, the projected beam 108 may miss (or bleed over) the opaque shapes of pattern 114, travel through the clear plastic or glass (for example) of body 118, and reflect off of the fluorescent painted surface 120 as yellow-orange contrasting to the green illumination if the curvilinear elements 124 of pattern 114 are black, for example. If the curvilinear elements 124 of pattern 114 are made of a color that absorbs the wavelength of light emitted by the laser projector, then substantially no light may be reflected from the pattern 114, making it even easier to see any light that bleeds over the edges of the curvilinear elements 124, indicating misalignment of the laser beam 108 with the pattern 114.

Figure 4:
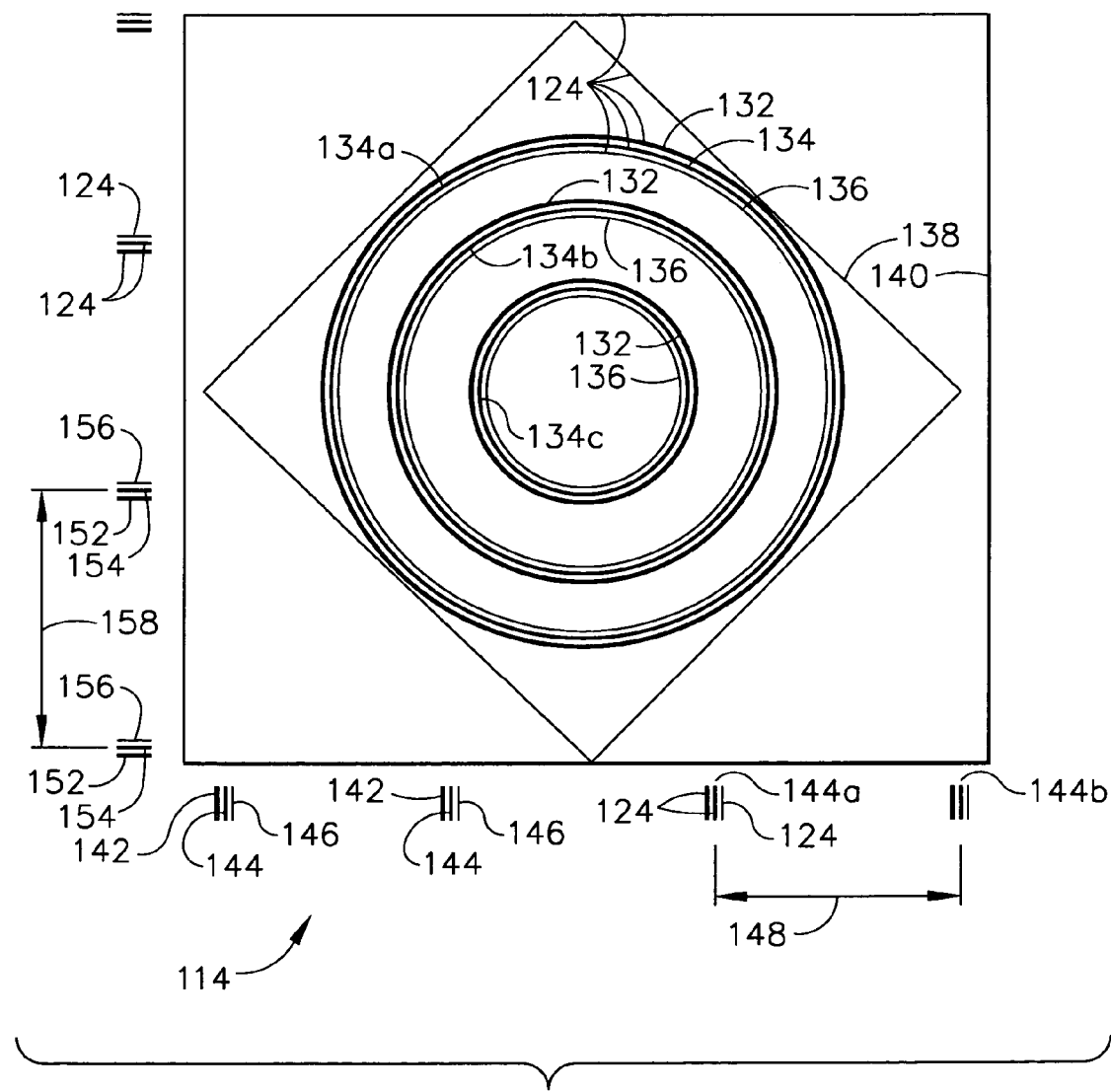
FIG. 4 is an elevational view of an exemplary set of patterns that may be provided on a calibration/certification fixture according to one embodiment of the present invention.

FIG. 4 illustrates one example of a pattern 114, which may include a number of test elements and patterns providing different functions and tests in accordance with embodiments of the present invention. For example, a functional test may be provided by one set of patterns included in pattern 114 and calibration test may be provided by another set of patterns included in pattern 114.

For example, circular pattern 134 diamond pattern 138, and square pattern 140 of pattern 114 may be used to perform a "functional" test that checks for conformance of laser projection system 104 within a combined allowance for nominal beam width and positioning accuracy. For the example pattern 114 illustrated in FIG. 4, circular pattern 134 may include three concentric circles 134a, 134b, and 134c. Circular test patterns effective for the functional test—such as circular pattern 134—could also be made using only one circle or any number of circles whether concentric or not. The exemplary beam width and positioning tolerances given above will be used to illustrate possible dimensions and tolerances for one example pattern 114 in accordance with one embodiment. For the functional test at a nominal projection distance of 15 feet, medium line weight patterns may be used, e.g., circular pattern 134, diamond pattern 138, and square pattern 140 may be used. Each of these patterns may comprise curvilinear elements 124 having a prescribed width 128 (as shown more clearly in FIG. 2). For the functional test, the prescribed width 128 may combine the nominal beam width with added width to allow for positioning error in either direction from dead center, e.g., the sum of nominal beam width plus a width equal to twice the positioning accuracy. Thus, in the example given of nominal beam width 0.030 in. and positioning accuracy ±0.015 in. at nominal 15 feet projection distance 106 (shown in FIG. 1) the prescribed width 128 for curvilinear elements 124 of patterns 134, 138, and 140 may be 0.060 in. The prescribed width 128 of 0.060 in. may be specified to be formed within a certain degree of accuracy. For example, width 128 may be specified as 0.060 in. plus 0.000 in, and minus 0.002 in. For example, it is known to use CAD technology to achieve the required degree of accuracy.

Furthermore, it is possible to use 3-dimensional measuring instruments, as known in the art, to provide updated CAD model data from pattern 114 after it is formed. For example, if the original CAD model for circular pattern 134 allows for a circle having an inside radius of 12.000 in. and width 128 of 0.060 in. but the actual circle of circular pattern 134 measures (within the specified tolerance) to a width of 0.058 in. with an inside radius of 12.002 in., then the CAD model may updated to allow for the circle actually measured and the updated CAD model data may be provided to projection system 104 for performing the functional test.

In a similar manner, circular patterns 132 and 136 may be formed to provide functional test elements for functional tests at the exemplary nominal projection distances of 40 feet and 6 feet, respectively. Circular patterns 132 and 136 may also include one or more circles whether concentric or not, similarly to the description given above in regard to circular pattern 134 and circles 134a, 134b, and 134c. For the nominal beam width 0.080 in. and positioning accuracy ±0.040 in. at nominal 40 feet projection distance 106, the prescribed width 128 for curvilinear elements 124 of patterns 132 may be 0.160 in. For the nominal beam width 0.012 in. and positioning accuracy ±0.006 in. at nominal 6 feet projection distance 106, the prescribed width 128 for curvilinear elements 124 of patterns 136 may be 0.024 in. Actual measurements for these patterns may also be taken and provided in appropriate form to laser projection system 104. Thus, functional test may be provided at various projection distances.

Due to the physical attributes of projection systems, such as the rotation of mirrors being used to direct the projection of the laser beam, it may be desirable to provide the functional test for different pattern shapes, such as the exemplary circles, diamond, and square shown in FIG. 4. For example, the same laser projection system may pass a circle test without being able to trace the horizontal or vertical lines or corners of a rectangular shape such as diamond pattern 138 or square pattern 140. Tracing the oblique, straight lines of diamond pattern 138 may require coordination, for example, between rotating mirrors not required by circular pattern 134 or square pattern 140. Thus, a number of different patterns may be included in pattern 114, as shown in FIG. 4.

Because the functional test elements—such as circular patterns 132, 134, 136—provide curvilinear elements 124 with a width 128 wide enough to block the width 126 of laser beam 108 with an allowance for positioning error, laser projection system 104 may pass a functional test if its combined nominal beam width and positioning accuracy are within specifications.

A "calibration" test may also be provided, for example, using calibration test elements 142, 144, 146, 152, 154, 156. The calibration test elements may be provided with different prescribed widths for calibration tests at different projection distances 106, the wider curvilinear element widths 128 of calibration test elements 142, 152 being provided for the longer projection distances and narrower curvilinear elements 124 of test elements 146, 156 being provided for the shorter test projection distances 106. At the exemplary test projection distance of 15 feet, vertical test elements 144 and horizontal test elements 154 may be used. As described above in regard to providing various test shapes, it may be beneficial to provide both horizontal test elements 152, 154, 156 and vertical test elements 142, 144, 146.

For example, a calibration test at the nominal projection distance of 15 feet may be performed using test elements 144. Calibration test elements 144 may have a prescribed width 128 equal, for example, to the exemplary nominal beam width of 0.030 in. As described above, calibration test elements 144 may be formed to within a prescribed tolerance, such as 0.030 in. plus 0.000 in. and minus 0.002 in. Particular calibration test elements 144—such as mark 144a and mark 144b may be set at a prescribed distance 148 from each other, for example, to provide a calibration test of horizontal distance. Similarly, pairs of horizontal calibration test elements—such as elements 154 may be formed at a prescribed vertical distance 158, for example, to provide a calibration test of vertical distance. Also as described above, CAD technology may be used for forming a calibration test pattern, such as pattern 114 including, for example, calibration test elements 144 and 154, or for example, calibration test elements 144 and 154 at distances 148 and 158. The calibration test pattern may be formed to a specified tolerance, measurements may be made of the test pattern, used to update a CAD model, and provide test data in an appropriate format to the projection system 104, as described above.

A calibration test may be performed at the nominal projection distance of 15 feet may be performed using test elements 144, for example, by using laser projection system 104 to project laser beam 108 onto a first calibration test element 144, e.g. mark 144a. If laser beam 108 bleeds over both edges of mark 144a, as indicated, for example, either by contrasting color reflection or presence of background reflection from certification fixture 102, as described above, the laser beam 108 does not conform to its nominal beam width (e.g., beam 108 is too wide to fit within prescribed width 128 of mark 144a) and laser projection system 104 may be regarded as failing the calibration test. If laser beam 108 bleeds over one edge of mark 144a, as indicated by certification fixture 102, an input may be given to laser projection system 104 to reposition beam 108 until laser beam 108 bleeds over both edges, failing the calibration test as before, or until laser beam 108 "fits" within mark 144a as indicated, for example, either by no contrasting color reflection or absence of background reflection from certification fixture 102, as described above, passing the calibration test for nominal beam width. At this point, the laser projection system 104 may be further tested for length accuracy, for example, using conformance to horizontal distance 148, by projecting laser beam 108 onto both first mark 144a and second mark 144b. If laser projection system 104 concurrently projects laser beam 108 to fit within both marks 144a and 144b, then laser projection system 104 may be considered to have passed a calibration test for length accuracy; otherwise, laser projection system 104 may be considered to have failed the calibration test for length accuracy. Thus, it may be seen that a calibration test for nominal beam width can be isolated from a calibration test for length accuracy so that the two calibration tests may be performed independently.

Moreover, calibration tests using other calibration test elements at different orientations and projection distances (widths) may be understood as being similar with appropriate modifications. For example, calibration test elements 142, 152 may have a prescribed width 128 equal, for example, to the exemplary nominal beam width of 0.080 in. at nominal 40 feet projection distance, and calibration test elements 146, 156 may have a prescribed width 128 equal, for example, to the exemplary nominal beam width of 0.012 in. at nominal 6 feet projection distance. Also for example, horizontal calibration test elements 152, 154, 156 may be used to test laser projection system length accuracy against vertical distance 158.

Figure 5:
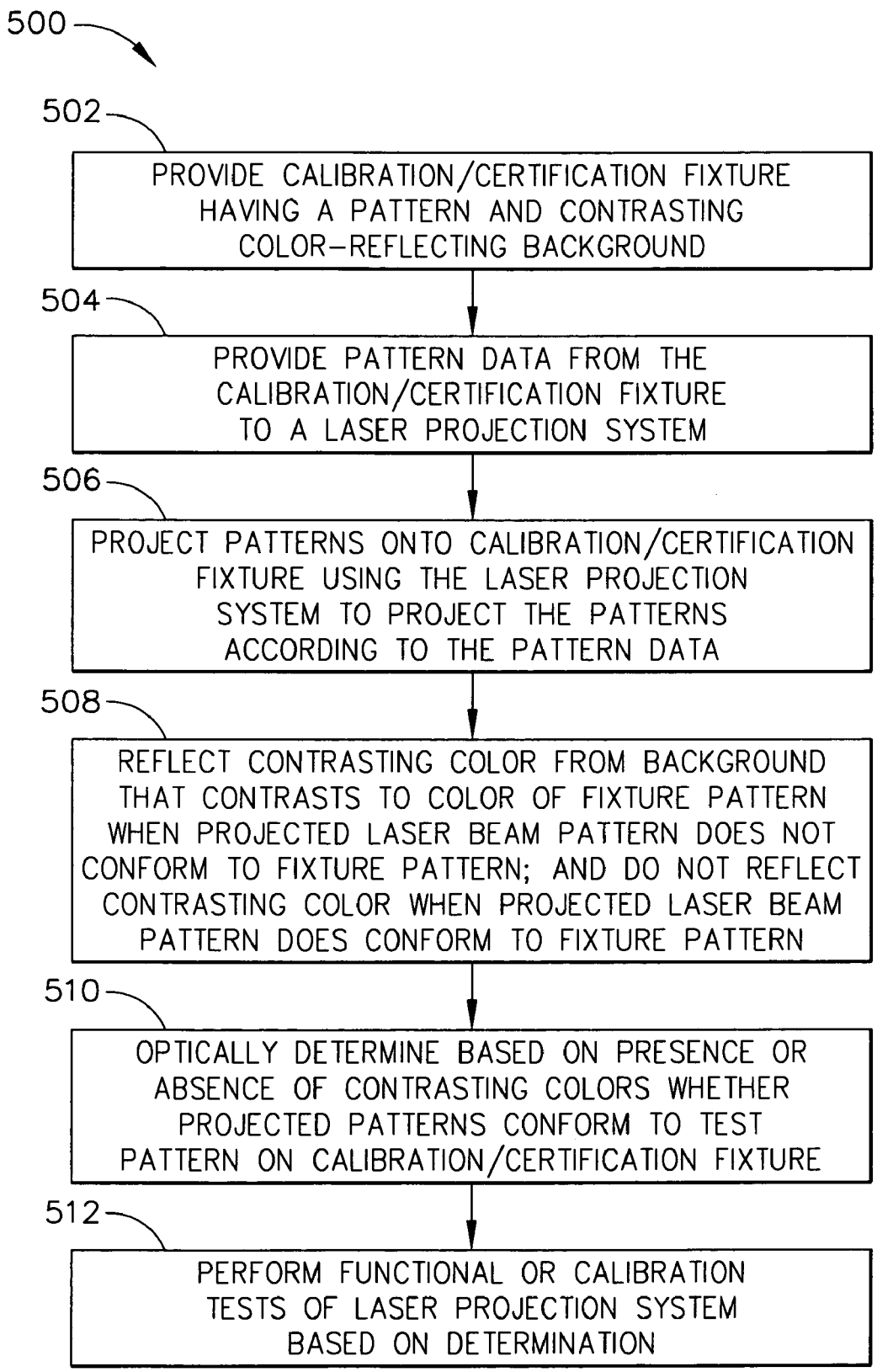
FIG. 5 is a flowchart of a method for calibrating and certifying laser projection beam accuracy in accordance with one embodiment of the present invention.

FIG. 5 is a flowchart of a method 500 for calibrating and certifying laser beam projection accuracy in accordance with one embodiment of the present invention. At step 502, a calibration/certification fixture—such as certification fixture 102—may be provided having a test pattern—such as pattern 114—and contrasting color-reflecting background—such as background 122. The pattern and background light-reflective properties may be chosen, for example, so that illumination of both by a laser beam produces reflections of contrasting colors or, alternatively, the pattern may be absorbent to a specific laser beam color, for example, so that illumination of both by a laser beam of the specific color produces a bright outline of a portion of the pattern reflected from the background.

At step 504, pattern data—such as data for pattern 114—from the certification fixture 102 may be provided to a laser projection system—such as laser projection system 104. For example, CAD model data or measurements used to update CAD model data may be provided to laser projection system 104 as described above. Step 502 may also include setup, and establishing a reference frame origin between laser projection system 104 and certification fixture 102, as known in the art.

At step 506, the pattern data—such as data for pattern 114—provided to laser projection system 104 may be used to project a laser beam pattern according to the pattern data onto certification fixture 102. For a laser projection system 104 that is within specifications, the laser beam 108 may be expected to trace out the pattern 114 conforming to pattern 114, where conformance of a laser beam to a pattern is as described above.

At step 508, a contrasting color—such as portion 130 of laser beam 108—may be reflected from the background 122 that contrasts to the color of the fixture pattern 114 when the projected laser beam pattern does not conform to the fixture pattern 114; and no contrasting color may be reflected when the projected laser beam pattern does conform to fixture pattern 114. Alternatively, if pattern 114 is chosen to absorb light of the laser beam color, any portion—such as portion 130—of laser beam 108 may be reflected from the background 122 when the projected laser beam pattern does not conform to the fixture pattern 114 and no color (i.e., no portion 130) may be reflected when the projected laser beam pattern does conform to fixture pattern 114. At step 510, either of the two criteria just described may be applied to laser beam 108 to decide whether laser projection system 104 conforms to pattern 114 or, for example, to specific portions of pattern 114—such as a functional test pattern or a calibration test pattern.

At step 512, a functional test may be performed, for example, by deciding whether, as described above, laser projection system conforms to a functional test pattern— such as pattern 134. Additionally or alternatively, a calibration test may be performed, for example, by deciding whether, as described above, laser projection system conforms to a calibration test pattern—such as pattern 144 or a pattern including marks 144a and 144b.

It should be understood, of course, that the foregoing relates to exemplary embodiments of the invention and that modifications may be made without departing from the spirit and scope of the invention as set forth in the following claims.

We claim:

1. A system for certifying laser beam projection accuracy comprising:
   a certification fixture having a pattern and a color background; and
   a projection apparatus configured to project a laser beam having a nominal beam width on the pattern with an accuracy to be determined, wherein the laser beam is reflected from said pattern with a first color and any portion of the laser beam projected onto said fixture but not on said pattern is reflected from said color background and is reflected with a second color different from said first color, and wherein said pattern includes a calibration test pattern for a calibration test of beam width wherein:
   illumination of said pattern and no illumination of said color background by said laser beam indicates passing the calibration test, and
   illumination of said color background by said laser beam reflecting said second color contrasting to said first color reflected from said pattern indicates one of: a) a need for iterating the calibration test, and b) failure of the calibration test.

2. The system of claim 1, wherein:
said pattern includes a curvilinear element; and
said projection apparatus is configured to trace said laser beam on said curvilinear element with said accuracy.

3. The system of claim 1, wherein said projection apparatus passes a functional test when said laser projection system projects said laser beam within said pattern.

4. The system of claim 1, wherein said projection apparatus fails a functional test when said projection apparatus projects at least a portion of said laser beam outside said pattern and onto said color background.

5. The system of claim 1, wherein said second color is seen as a contrasting color to said first color of said laser beam, and said projection apparatus fails a functional test when said projection apparatus projects at least a portion of said laser beam outside said pattern and onto said color background.

6. The system of claim 1, wherein said projection apparatus passes a calibration test when said projection apparatus projects said laser beam within said pattern.

7. The system of claim 1, wherein said projection apparatus fails a calibration test when said projection apparatus projects at least a portion of said laser beam outside said pattern and onto said color background.

8. The system of claim 1, wherein said second color is seen as a contrasting color to said first color of said laser beam and said projection apparatus fails a calibration test when said projection apparatus projects at least a portion of said laser beam outside said pattern and onto said color background.

9. A system for certifying laser beam projection accuracy comprising:
a certification fixture having a pattern and a color background; and
a laser projection system that projects a laser beam having a nominal width and nominal positioning accuracy wherein:
said laser projection system projects said laser beam onto said pattern with an accuracy to be determined and said laser beam is reflected from said pattern with a first color;
when said laser beam does not conform to said pattern, a portion of said laser beam is reflected from said color background and is reflected with a second color different from said first color; and
said pattern includes a functional test pattern for a functional test of beam width combined with positioning tolerance wherein:
illumination of said pattern combined with no illumination of said background by said laser beam indicates passing the functional test, and
illumination of said color background by said laser beam of said second color contrasting to said first color reflected from said pattern indicates failing the functional test.

10. The system of claim 9, wherein illumination of said pattern and said background by said laser beam provides radiation reflected from the pattern but not from the background that contrasts in color to radiation reflected from the background but not from the pattern.

11. The system of claim 9, wherein said pattern is disposed on a front surface of said certification fixture and said color background is at a rear surface of said certification fixture so that said pattern and said color background are illuminable from the same direction.

12. A fixture for certifying laser beam projection accuracy comprising:
a transparent body;
an opaque pattern applied to said transparent body, wherein said pattern includes a curvilinear functional test element having a width equal, within a specified tolerance, to the sum of a nominal width of said laser beam plus twice a nominal positioning accuracy of said laser beam; and
a reflective background, wherein:
when a laser beam having a first color is projected onto said pattern but does not conform to said pattern, a portion of said laser beam is reflected from said background and is reflected with a second color different from said first color.

13. The fixture of claim 12, wherein said body is a transparent plate with said pattern on a front surface and said background on a rear surface.

14. The fixture of claim 12, wherein said pattern reflects light of said first color.

15. The fixture of claim 12, wherein said pattern absorbs light of said first color.

16. The fixture of claim 12, wherein said pattern includes a functional test element having a rectangular shape for testing tracking around corners.

17. The fixture of claim 12, wherein said pattern includes a functional test element having a rectangular shape with vertical and horizontal line segments for testing straight line tracking.

18. The fixture of claim 12, wherein said pattern includes a functional test element having a rectangular shape with oblique line segments for testing straight line tracking.

19. The fixture of claim 12, wherein said pattern includes a curvilinear calibration test element having a width equal, within a specified tolerance, to the nominal width of said laser beam.

20. A laser measurement system comprising:
a laser projection system that projects a laser beam having a first color, a nominal beam width, and a nominal positioning accuracy; and
a certification fixture having a substantially transparent body, a pattern formed on a front surface of said body, and a color background on a rear surface of said body, wherein illumination of said pattern and said background through said body by said laser beam provides radiation reflected from a portion of the background but not from the pattern that contrasts in color to radiation reflected from the pattern but not from the background, wherein said pattern includes a calibration test pattern for a calibration test of beam width wherein said pattern includes a curvilinear calibration test element having a width equal, within a specified tolerance, to said nominal beam width.

21. The laser measurement system of claim 20, wherein said pattern includes a functional test pattern for a functional test of said nominal beam width combined with positioning tolerance wherein said pattern includes a curvilinear functional test element having a width equal, within a specified tolerance, to said nominal beam width plus twice said nominal positioning accuracy.

22. The laser measurement system of claim 20, wherein said pattern includes a functional test pattern for a functional test of beam width combined with positioning tolerance wherein:
illumination of said pattern combined with no illumination of said background by said laser beam indicates passing the functional test, and illumination of said color background by said laser beam of a color contrasting to the color of said pattern indicates failing the functional test.

23. The laser measurement system of claim 20, wherein said pattern includes a calibration test pattern for a calibration test of beam width wherein:
illumination of said pattern and no illumination of said background by said laser beam indicates passing the calibration test, and
illumination of said color background by said laser beam of a color contrasting to the color of said pattern indicates one of: a) a need for iterating the calibration test, and b) failure of the calibration test.

24. A system for certifying laser beam projection accuracy comprising:
a laser projection system that projects a laser beam having a first color, a nominal beam width, and a nominal positioning accuracy;
a certification fixture having a body;
a pattern formed on a front surface of said body; and
a color background on a rear surface of said body, wherein:
projection of said laser beam on said pattern and said background through said body provides radiation reflected from a portion of the background but not from the pattern that contrasts in color to radiation reflected from the pattern but not from the background;
said laser projection system projects said laser beam using data measured from said pattern to trace said laser beam on said pattern;
said pattern includes a functional test pattern for a functional test of beam width combined with positioning accuracy wherein said functional test pattern includes a curvilinear functional test element having a width equal, within a specified tolerance, to the nominal beam width of said laser beam plus twice the nominal positioning accuracy of said laser beam and wherein:
said laser projection system passes said functional test when said laser projection system projects said laser beam within said pattern, and
said laser projection system fails said functional test when said laser projection system projects at least a portion of said laser beam outside said pattern and onto said color background and
said pattern includes a calibration test pattern for a calibration test of beam width wherein said calibration test pattern includes a curvilinear calibration test element having a width equal, within a specified tolerance, to the nominal width of said laser beam and wherein:
said laser projection system passes said calibration test when said laser projection system projects said laser beam within said pattern; and
said laser projection system does not pass said calibration test when said laser projection system projects at least a portion of said laser beam outside said pattern and onto said color background.

25. A method for certifying laser beam projection accuracy comprising the steps of:
projecting a laser beam onto a certification fixture having a pattern and a background wherein said laser beam conforms to said pattern when said laser beam projects only onto said pattern and said laser beam does not conform to said pattern if at least a portion of said laser beam projects off of said pattern and onto said background;
reflecting a portion of said laser beam from said background of said certification fixture wherein said portion has a first color that contrasts with a second color of said background of said certification fixture when said laser beam does not conform to said pattern;
not reflecting radiation of said first color contrasting to said second color of said background when said laser beam does conform to said pattern;
forming said pattern on said certification fixture according to a CAD model data,
updating said CAD model data with measurements from said pattern;
providing the undated CAD model data to a laser projection system; and
projecting said laser beam from said laser projection system onto said certification fixture.

26. The method of claim 25, further including steps of:
forming said pattern on said certification fixture according to a CAD model data,
providing said CAD model data to a laser projection system, and
projecting said laser beam from said laser projection system onto said certification fixture.

27. The method of claim 25, further including a step of performing a functional test of a laser projection system using a functional test pattern on said certification fixture.

28. The method of claim 25, further including a step of performing a calibration test of a laser projection system using a calibration test pattern on said certification fixture.

29. The method of claim 25, further including steps of:
certifying a laser projection system when no second color contrasting to said first color is seen, and
rejecting certification of a laser projection system when said second color contrasting to said first color is seen.

30. A method for performing a calibration test comprising the steps of:
projecting a laser beam having a nominal beam width onto a certification fixture, having a calibration test pattern for a calibration test of beam width and a background wherein said laser beam conforms to said calibration test pattern when said laser beam projects only onto said calibration test pattern and said laser beam does not conform to said calibration test pattern if at least a portion of said laser beam bleeds over said calibration test pattern and onto said background;
reflecting, when said laser beam does not conform to said calibration test pattern, at least a portion of said laser beam from said background of said certification fixture but not from said pattern wherein said reflected portion has a first color that contrasts with a second color of said background of said certification fixture, and said first color contrasts with a third color of said laser beam reflected from said calibration test pattern;
not reflecting, when said laser beam does conform to said calibration test pattern, radiation of said first color contrasting to said second color of said background when said laser beam does not bleed over said calibration test pattern;
performing a calibration test of beam width, including:
repositioning said laser beam when said laser beam does not conform to said calibration test pattern and a first edge of said laser beam bleeds over said calibration test pattern;
failing the calibration test when said laser beam does not conform to said calibration test pattern and two edges of said laser beam simultaneously bleed over said calibration test pattern; and
passing the calibration test when said laser beam conforms to said calibration test pattern.

31. The method of claim 30, further including steps of:
projecting a laser beam onto a calibration test pattern that includes a first mark at a first distance from a second mark;
failing a length accuracy test when said laser beam does not concurrently fit within both said first mark and second mark; and
passing the length accuracy test when said laser beam concurrently fits within both said first mark and second mark.

* * * * *